United States Patent Office 3,159,578
Patented Dec. 1, 1964

3,159,578
ORGANIC FUNCTIONAL FLUIDS AND POLYMERIC AMINE SALT ADDITIVES THEREFOR
Ralph Lutwack, Oakland, Calif., assignor to Shell Oil Company, New York, N.Y., a corporation of Delaware
No Drawing. Filed Feb. 26, 1960, Ser. No. 11,146
4 Claims. (Cl. 252—32.7)

This invention relates to improved functional organic compositions and additives therefor. More particularly, the invention relates to oleaginous materials such as lubricants containing a novel additive.

In general functional organic fluids such as lubricants, fuels, hydraulic fluids and the like are doped with various soluble antioxidants, e.g., alkyl phenols or aromatic amines; detergents and corrosion inhibitors such as organic salts, e.g. metal carboxylates, phenates, phosphates, sulfonates and thiocarbamates; antiwear and extreme pressure agents such as sulfur, chlorine and/or phosphorus-containing compounds, e.g. organic phosphites, phosphates, phosphonates, sulfurized fatty materials, sulfurized oleic acid or sperm oil, chlorinated paraffin wax, etc. However, these compounds break down when used in organic liquids such as hydrocarbon fuels and oils and are subjected to severe temperature and pressure conditions, and rapidly deteriorate and fail to impart their expected desired properties.

It has now been found that the effectiveness of functional organic fluids is substantially improved, particularly with respect to stability, detergency and wear inhibition, by addition thereto of a minor amount (0.1–5%, preferably 1–3% by weight) of a complex or salt of a polymeric nitrogen-containing compound and a thioalkylphosphonic acid or monoester thereof. The acid portion of the polymer has the general formula:

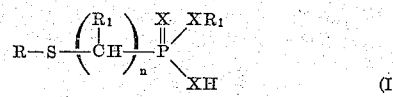
(I)

wherein R is a hydrocarbyl group such as an alkyl, aryl, aralkyl, alkaryl or cycloalkyl radical of from 1 to 30, preferably 4 to 18 carbon atoms, the $R_1$'s are the same or different groups which may be hydrogen or a $C_{1-8}$ alkyl radical, $n$ is an integer preferably 1–4 and preferred when $n$ is 1 and the X's are oxygen and/or sulfur, preferably oxygen.

By the term "polymer nitrogen-containing compound" herein is meant a polymer, including copolymers, of monomers having polymerized linkages and containing nitrogen-containing groups which may be amino or amido groups. They may be derived from polymerizable monomers containing primary, secondary or tertiary (the latter two are preferred) amino nitrogen, including heterocyclic amino or amido nitrogen-containing substances, having an ethylenically unsaturated polymerizable group.

Various well kown polymeric amines are suitable for the preparation of complexes or salts which are useful in the present invention. They may be simple polymers, such as those obtained by polymerizing vinyl substituted heterocyclic nitrogen-containing substances such as vinyl pyridine, vinyl picoline and vinyl quinoline, vinyl pyrrolidone or vinyl arylamines such as para-aminostyrene, or polyamines prepared by reducing, in the presence of ammonia or primary or secondary amines, the polymerized acrylates and methacrylates of hydroxy alkyl tertiary amines, and the like. The preferred polymeric amino or amido compounds are those containing tertiary amine groups and particularly those containing heterocyclic amino groups such as obtained by copolymerizing a polymerizable heterocyclic nitrogen base compound with a polymerizable unsaturated material free of heterocyclic nitrogen-containing radicals such as are described in British patent specification 760,544 and U.S. Patents 2,839,512 and 2,889,282. The copolymers include: copolymer of stearyl methacrylate and 2-methyl-5-vinyl pyridine, copolymer of stearyl methacrylate, lauryl methacrylate and 2-methyl-5-vinyl pyridine, and those which contain additional $C_{1-4}$ alkyl methacrylates in the polymer, such as copolymers of stearyl methacrylate, lauryl methacrylate, methyl methacrylate and 2-methyl-5-vinyl pyridine, and similar copolymers in which the methyl methacrylate is replaced by butyl methacrylate and the 2-methyl-5-vinyl pyridine is replaced by 5-ethyl-2-vinyl pyridine or copolymers of lauryl methacrylate and N-vinyl pyrrolidone or similar copolymers as described in Belgian Patent 550,442 or British Patent 806,664, and mixtures thereof. Acrylate-vinyl pyrrolidone copolymers are sold by Rohm and Haas under the designations Acryloid 917 and 966. Other suitable polymeric amines are those available commercially such as those sold by E. I. du Pont de Nemours and Co. under the designations LOA 564 and 565, which are copolymers of lauryl methacrylate and diethylamonoethylmethacrylate (see U.S. Patent 2,737,496).

The acid portion of the polymeric amine salt or complex is represented by Formula I, but more specifically and preferably by the formula

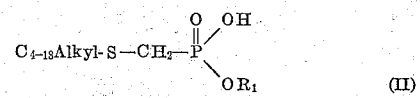
(II)

wherein $R_1$ is the same as defined in (I) and preferably is a $C_{1-8}$ alkyl radical. They are prepared by reacting a mercaptan or mercaptide having at least 6 carbon atoms with a 1-haloalkylphosphono, preferably a halomethylphosphono, compound such as chloromethylphosphonic acid or chloromethylphosphonate or their thio derivatives, in a suitable solvent, such as an aqueous alcohol solution, at reflux temperature and under inert conditions until the reaction is completed, which may require from 1 to about 5 days. The mercaptans include: aliphatic mercaptans, such as methyl, ethyl, hexyl, octyl, decyl, dodecyl and octadecyl mercaptans; cycloalkyl mercaptans, such as cyclohexyl mercaptan and dicyclohexyl mercaptan; and aralkyl mercaptans, such as phenyldecyl mercaptan and benzyl mercaptan. Instead of the mercaptans, the corresponding mercaptides can be used such as the alkali metal, e.g., Na or K, mercaptides. Suitable 1-haloalkylphosphono compounds, e.g. halomethylphosphono compounds include chloromethylphosphonic acid, mono or dihydrocarbyl chloro methylphosphonates, e.g., mono or dibutyl chloromethylphosphonate, mono or di-2-ethylhexyl chloromethylphosphonate, mono or dilauryl chloromethylphosphonate, mono or diphenyl chloromethylphosphonate, mono or dicyclohexyl chloromethylphosphonate, mono or dibenzyl chloromethylphosphonate, dibutyl chloromethyldithiophosphonate, diphenyl chloromethyldithiophosphonate, dibutyl chloromethyltrithiophosphonic acid, Na and K salts of monobutyl chloromethylphosphonic acid, Na and K salts of monodecyl chloromethylphosphonic acid, or chloroethylphosphonic acid, butyl-1-chloroethylphosphonic acid and the like.

A preferred method of making the thiophosphono compounds, e.g., thiomethylphosphonates is to react a suitable mercapto compound, such as an alkali metal, e.g., Na or K, $C_{10-18}$ alkyl mercaptide with an alkali metal, e.g., Na or K, salt of chloromethylphosphonic acid in an alcoholic solution under reflux conditions and under an inert atmosphere to form the alkali metal salt of an alkyl mercaptomethylphosphonic acid. The salt is then treated with a strong acid such as hydrochloric acid to free the alkylmercaptomethylphosphonic acid, which can be converted into the desired polymeric amine salts.

The following examples illustrate the preparation of the acid portion of the salt for use in accordance with the present invention.

*Example A*

Stoichiometric amounts of the potassium salt of decyl mercaptan and monochloromethylphosphonic acid were dispersed in an aqueous solution of ethyl alcohol and the mixture was refluxed at 78° C. under a nitrogen atmosphere for about 1 day. The potassium decylmercaptomethylphosphonate was then treated with strong hydrochloric acid to free the phosphonic acid which was recovered by extraction with ether. The final product, decylmercaptomethylphosphonic acid, analyzed as follows:

|  |  |  |  |  | Equivalent Weight | |
|---|---|---|---|---|---|---|
|  |  |  |  |  | First Hydrogen | Both Hydrogen |
| Found | 49.1 | 9.4 | 12.0 | 11.2 | 261 | 132 |
| Expected | 49.2 | 9.4 | 11.94 | 11.54 | 268.3 | 134.1 |

*Example B*

The monobutyl ester of decylmercaptomethylphosphonic acid was prepared by fully esterifying the acid of Example I and thereafter partially hydrolyzing the diester with alcoholic KOH under reflux conditions for about 24 hours.

The following additional representative compounds were prepared by the above method: octymercaptomethylphosphonic acid, dodecylmercaptomethylphosphonic acid, cyclohexylmercaptomethylphosphonic acid, benzylmercaptomethylphosphonic acid, phenylmercaptomethylphosphonic acid, butyl decylmercaptomethyl acid phosphonate, phenyl decylmercaptomethyl acid phosphonate, monobutyl dodecylmercaptomethyl acid thiophosphonate, monobutyl phenylmercaptomethyl acid phosponate, monooctyl cyclohexylmercaptomethylthio acid thiophosphonate monobutyl mercaptoethylphosphonate.

The salts or complexes used in accordance with this invention may be prepared by any of the conventional methods for complexing nitrogen-containing organic compounds on organic acids. Thus, a polymeric amine may be dissolved in an organic solvent, such as benzene or xylene, and the acid added to the solution with agitation. The acid itself may, of course, be dissolved in a suitable solvent. Alternatively, the polymeric amine may be suspended in a suitable liquid medium and the acid stirred into the suspension. When using these methods, it may be necessary to isolate the salt by removing the solvent or suspending medium before the salt is added to the lubricating oil. Simpler methods, such as merely adding the acid to the melted polymeric amine, are also suitable on occasion. Also the acid and the polymeric amine may be added to the lubricating oil to allow salt formation in situ.

It is often convenient to manufacture the salts or complexes used in accordance with the invention by the interaction of a salt of the oil-soluble polymeric amine with a metal, amine or ammonium salt of the thioalkylphosphono compound such as thiomethylphosphono compound, e.g. ethylthiomethylphosphonic acid. As salts or complexes of the oil-soluble polymeric amines there may be used, for example, the chloride, bromide, carbonate, acetate or sulphate salts, and as metal salts of the said thiophosphono acids there may be used, for example, the potassium, sodium, calcium, barium, magnesium, mercury or zinc salts. It is preferred, however, to choose a salt of the oil-soluble polymeric amine and a metal salt of the thiomethylphosphonic acid or monoester thereof such that the inorganic metal salt so formed by double decomposition is insoluble in the resulting oil-soluble polymeric amine thiomethylphosphonate and in the solvent, as it is thereby more readily removed, for example, by filtration.

A typical process comprises dissolving the salt of the oil-soluble polymeric amine in an inert solvent, e.g., benzene, and adding to the solution, with stirring, a solution of the metal salt of the dithiocarbamic acid in the same solvent. A precipitate of the inorganic metal salt is formed by double decomposition which is removed by filtration and the salt of the oil-soluble polymeric amine and the thiomethylphosphonic acid is then isolated by distilling off the solvent, preferably under reduced pressure.

It is not essential that all the basic nitrogen groups in the polymer be neutralized by the acid. In fact, better results may be obtained when the final product contains unneutralized basic nitrogen atoms. To leave some unneutralized basic nitrogen atoms may be desirable if the salt is required to act as a detergent additive as well as a viscosity index improver.

The nitrogen-containing polymeric salts of thiomethylphosphonic acids or monoesters thereof used in oil compositions of the present invention are novel salts and form one feature of the present invention. Of this class of novel salts, those preferred are derived from copolymers having a molecular weight of from about 75,000 to about 1,000,000 and derived from a vinyl pyridine and an ester of an acrylic acid in which the acrylic acid moiety has no more than 5 carbon atoms. Preferably the copolymer is one in which the molar ratio of polymerizable nitrogen base compound to polymerizable unsaturated material free of heterocyclic nitrogen-containing radicals in the copolymer is from about 1:1 to about 1:4.

The following examples illustrate the preparation of the novel complexes or salts provided by the present invention. In these examples, the parts referred to are parts by weight unless otherwise specified.

*Example I*

A mixture comprising 30.9 parts of lauryl methacrylate, 23.4 parts of stearyl methacrylate, 9 parts by weight of methyl methacrylate, 2.5 parts of 2-methyl-5-vinyl pyridine, 12.5 parts of benzene and 12.5 parts 100 neutral HVI oil is heated to 120° C. A 5% solution of di-t-butyl peroxide in the above mixture is added over a short period of time and polymerization commences after an induction period of about one hour. At the commencement of the polymerization 2-methyl-5-vinyl pyridine is added at such a rate as to maintain a constant 2-methyl-5-vinyl pyridine/methacrylate molar ratio of 0.069/1. The quantity of 2-methyl-5-vinyl pyridine added during the polymerization is approximately equal to the amount charged initially. At the end of the polymerization additional 1010 mineral oil is added and the benzene removed by steam stripping to yield a concentrate containing about 30% of polymer.

This concentrate is dissolved in benzene and a slight excess of hydrochloric acid (based on the nitrogen content) is added. The mixture is refluxed under a Dean and Stark head until no more water separates. To the resulting benzene solution is added a solution 3.4 parts by weight of monobutyl ester of decylmercaptomethylphosphonic acid in 90 parts by weight of benzene. The filtrate is distilled under reduced pressure to remove the benzene and the residue is a concentrate of the salt of the polymeric amine and monobutyl ester of decylmercaptomethylphosphonic acid in the 100 neutral HVI oil.

*Example II*

A polymeric amine is prepared by copolymerizing 3900 parts of lauryl methacrylate and 228 parts of 2-methyl-5-vinyl pyridine by the process described in Example I. The product is obtained as a 50% concentrate in 1010 mineral oil. To this concentrate, benzene and a slight excess of HCl are added to form the hydrochloride. After removal of water, 6.15 parts of ethylmercaptomethylphosphonic acid in benzene are added and the preparation completed as in Example I. The product is obtained as a concentrate in 1010 mineral oil.

Example III

To 110.5 parts of a polymeric concentrate as in Example I, 250 parts of benzene and 5.3 parts of potassium dodecylmercaptomethylphosphonate in 100 parts of benzene are added. The precipitated potassium chloride is removed by filtration and the benzene removed by distillation under reduced pressure. The product is obtained as a concentrate in 1010 mineral oil.

Example IV 31 parts of a polymeric amine containing 0.22 meq. basic nitrogen per gram marketed by Du Pont as LOA 564 (lauryl methacrylate/diethylamino ethyl methacrylate copolymer) are dissolved in 200 parts of benzene and converted to the hydrochloride by adding the theoretical amount of hydrogen chloride. A solution of 3.1 parts of dodecylmercaptomethylphosphonic acid in 100 parts of benzene is added and the precipitated potassium chloride filtered off. The benzene is removedf by distillation under vacuum. The product obtained is the dodecylmercaptomethylphosphonate salt of the polymeric amine.

Other examples of additives of this invention include:

V. Oil-soluble complex of lauryl methacrylate/N-vinyl pyrrolidone copolymer and mercaptomethylphosphonic acid.

VI. Oil-soluble complex of stearylmethacrylate/N-vinyl pyrrolidone copolymer and dodecylmercaptomethylphosphonic acid.

VII. Oil-soluble salt of vinyl quinoline/stearyl methacrylate copolymer and cyclohexylmercaptomethylphosphonic acid.

VIII. Oil-soluble salt of lauryl methacrylate/stearyl methacrylate/methyl methacrylate/2-methyl-5-vinyl pyridine copolymer and monobutyl ester of phenylmercaptomethylphosphonic acid.

IX. Oil-soluble salt of lauryl methacrylate/stearyl methacrylate/methyl methacrylate/2-methyl-5-vinyl pyridine copolymer and monooctyl ester of decylmercaptomethylthiophosphonic acid.

X. Oil-soluble salt of allylamine/stearyl methacrylate copolymer and monobutylester of cyclohexylmercaptomethylthiophosphonic acid.

Although the detergency and wear inhibition of various function fluids such as mineral oils or synthetic lubricants are greatly improved by addition thereto of the polymeric amine salt described, the oxidative stability of such compositions is greatly enhanced and the overall properties of such compositions substantially improved by addition thereto of a small amount (0.01–2% by weight, preferably 0.1–1% by weight) of a phenolic antioxidant compound such as mono or bisphenols, preferably phenols which contain at least one tertiary alkyl radical. Alkyl phenols of this type include 2,4,6-triethyl-, tributyl-, trioctyl-, 2,4-ditert-butyl-6-methyl-, 2,6-ditert-butyl-4-methyl-, 2,4,6-tritert-butyl-, 2,6-dicyclohexyl-4-methyl-, 2,6-dimethyl-4-cyclohexyl-phenols, 2,6-ditertbutyl, 2,2-ditertbutyl, 2,6 - tertbutylcyclohexyl, 2 - methyl-6-tertbutyl-4-methylphenols. The alkyl bisphenols include 1,1-bis-(2-hydroxy-3-t-butyl-5-methylphenyl)methane; bis(2-hydroxy - 3 - t - butyl - 5 - methylphenyl)ethane; 1,1 - bis-(2-hydroxy-3-t-butyl-5-methylphenyl)propane; bis(2-hydroxy-3-t-butyl-5-methylphenyl)butane; bis(2-hydroxy-3-t-butyl-5-methylphenyl)isobutane; 1,1-bis(6-hydroxy-5-t-butyl-3-methylphenyl)methane; bis(2-hydroxy-5-t-butyl-3-methylphenyl)ethane; 1,1-bis(2-hydroxy-5-t-butyl-3-methylphenyl)propane; 1,1-bis(2-hydroxy-5-t-amyl-3-methylphenyl)butane; 1,1-bis(2-hydroxy-5-t-amyl-3-methylphenyl)isobutane; etc. The 2,4,6-trialkyl phenols containing two tertiary alkyl groups in the 2,4- or 2,6-positions are preferred, such as 2,4-ditert-butyl-6-methyl-, 2,6-ditertbutyl-4-methylphenol or 2,6-ditert-butyl-4-methylolphenol or 4,4'-methylene bis(2,6-dibutylphenol).

The addition of the polymeric amine thiomethylphosphonate alone or in combination with a phenolic compound effectively stabilizes and improves various materials as oleaginous materials, polymers, fuels, waxes, resins and particularly liquid hydrocarbons such as gasoline, jet fuels, transformer oils, turbine oils, mineral lubricating oils, and industrial oils such as cutting fluids, quenching fluids, etc. The additives of this invention are particularly useful in highly refined mineral oils of the lubricating oil viscosity range (SAE 10W–SAE 90) from which natural occurring oxidation inhibitors have been removed by refining. Additionally, synthetic hydrocarbon oils and resins such as olefin polymers, e.g., ethylene/propylene, isobutylene/octadecene, isobutylene/styrene copolymers, etc., as well as synthetic oils of the ester type, e.g., di-2-ethylhexylsebacate, etc., are improved by the additive or additive combination of this invention.

The pronounced and unexpected results obtained by use of the polymeric amine salts of the invention are demonstrated when to a 1010 mineral oil, 2% of additive of Example I (Composition A), or 2% of additive of Example II (Composition B), or 2% of additive of Example II and 0.3% of 2,6-ditertbutyl-4-methylphenol (Composition C) or 2% of additive of Example II and 0.2% of 2,6-diterbutyl-4-methylolphenol (Composition D), or 3% of additive of Example II and 0.1% of 4,4'-methylene bis-(2,6-ditertbutylphenol) (Composition E), showed a wear resistance and oxidation stability of 4 to 10 times that of the 1010 neat mineral oil or the same oil containing 2% decylmercaptothiomethylphosphonic acid (Composition X), or the same oil containing 2% of the polymeric amine of Example I (Composition Y), or the same oil containing 0.4% of 2,6-ditertbutyl - 4 - methylolphenol (Composition Z). The wear resistance was determined by the iron powder adsorption test (Transaction of the Faraday Society, vol. 45, 1949, pages 623–631 and 631–635) and the oxidation stability was determined by the Dornte Oxidation Test (National Petroleum News, Sept. 17, 1941, pages R294–6).

Compositions of this invention are useful for providing stability and other desired properties to petroleum products such as mineral lubricating oils which also contain small amounts (0.1% to 3%) of their agents such as metal detergents such as metal organic sulfonates, e.g. neutral or basic Ca, Ba, or Zn petroleum sulfonates; antiwear agents such as metal thiocarbamates, e.g., Zn, Cr, or Ca dibutyl or diamyl dithiocarbamate; viscosity-index improvers, pour point depressants and non-ash forming detergents such as the oil-soluble nitrogen-free polymethacrylates available under the name "Acryloids" and, specifically, "Acryloid" 150, 618, 710, 768, described in U.S. Patent 2,710,842; extreme pressure agents such as organic sulfides, e.g., dibenzyl disulfide and mixtures thereof.

I claim as my invention:

1. A liquid hydrocarbon containing from about 0.1% to about 5% of an oil-soluble salt the cationic portion of which is selected from the group consisting of a copolymer of vinyl pyridine and an acrylate ester and of a copolymer of vinyl pyrrolidone and an acrylate ester each cation having a molecular weight of from about 75,000 to about 1,000,000 and the anionic portion of the salt is a monoester of a thiomethyl phosphonic acid.

2. A mineral lubricating oil containing from about 0.1% to about 5% of an oil-soluble salt the cation portion of which is a copolymer of vinyl pyrrolidone and lauryl methacrylate having a molecular weight of from about 75,000 to about 1,000,000 and the anionic portion of the salt is monobutyl ester of dodecylthiomethylphosphonate.

3. A liquid hydrocarbon containing from about 0.1% to about 5% of an oil-soluble salt the cation portion of which is a copolymer of a vinylpyridine and an acrylate ester having a molecular weight of from about 75,000 to about 1,000,000 and the anionic portion of the salt is a monoester of a $C_{4-18}$ alkyl thiomethylphosphonic acid.

4. A mineral lubricating oil containing from about 0.1% to about 5% of an oil-soluble salt the cation portion of which is a copolymer of stearyl methacrylate, lauryl methacrylate and 2-methyl-5-vinyl pyridine having a molecular weight of from about 75,000 to about 1,000,000 and the anionic portion of the salt is monobutyl dodecylthiomethylphosphonate.

References Cited in the file of this patent

UNITED STATES PATENTS

| | | |
|---|---|---|
| 2,535,174 | Tawney | Dec. 26, 1950 |
| 2,594,454 | Kosolapoff | Apr. 29, 1952 |
| 2,734,865 | Peeso et al. | Feb. 14, 1956 |
| 2,766,207 | McDermott | Oct. 9, 1956 |
| 2,798,045 | Buck et al. | July 2, 1957 |
| 2,879,285 | Birum | Mar. 24, 1959 |
| 2,889,282 | Lorensen et al. | June 2, 1959 |
| 2,971,019 | Ladd et al. | Feb. 7, 1961 |
| 2,973,323 | Millikan et al. | Feb. 28, 1961 |
| 3,012,055 | Pollitzer | Dec. 5, 1961 |
| 3,038,857 | Thomas | June 12, 1962 |
| 3,062,744 | Thompson | Nov. 6, 1962 |
| 3,074,990 | Cyba | Jan. 22, 1963 |

FOREIGN PATENTS

| | | |
|---|---|---|
| 799,037 | Great Britain | July 30, 1958 |